Aug. 11, 1953  M. SCHUCH  2,648,816

IGNITION TESTER

Filed Sept. 13, 1952

INVENTOR.
MARTIN SCHUCH
BY
Carl Miller
ATTORNEY

Patented Aug. 11, 1953

2,648,816

UNITED STATES PATENT OFFICE 2,648,816

IGNITION TESTER

Martin Schuch, Elizabeth, N. J.

Application September 13, 1952, Serial No. 309,417

1 Claim. (Cl. 324—15)

This invention relates to an ignition tester.

It is an object of the present invention to provide an ignition tester which is readily and easily attached to the distributor of an auto and which by a direct reading will enable the user to adjust his ignition points to factory specifications.

Other objects of the present invention are to provide an ignition tester bearing the above objects in mind which is of simple construction, inexpensive to manufacture, has a minimum number of parts, is easy to use and is efficient in operation.

Figure 1:
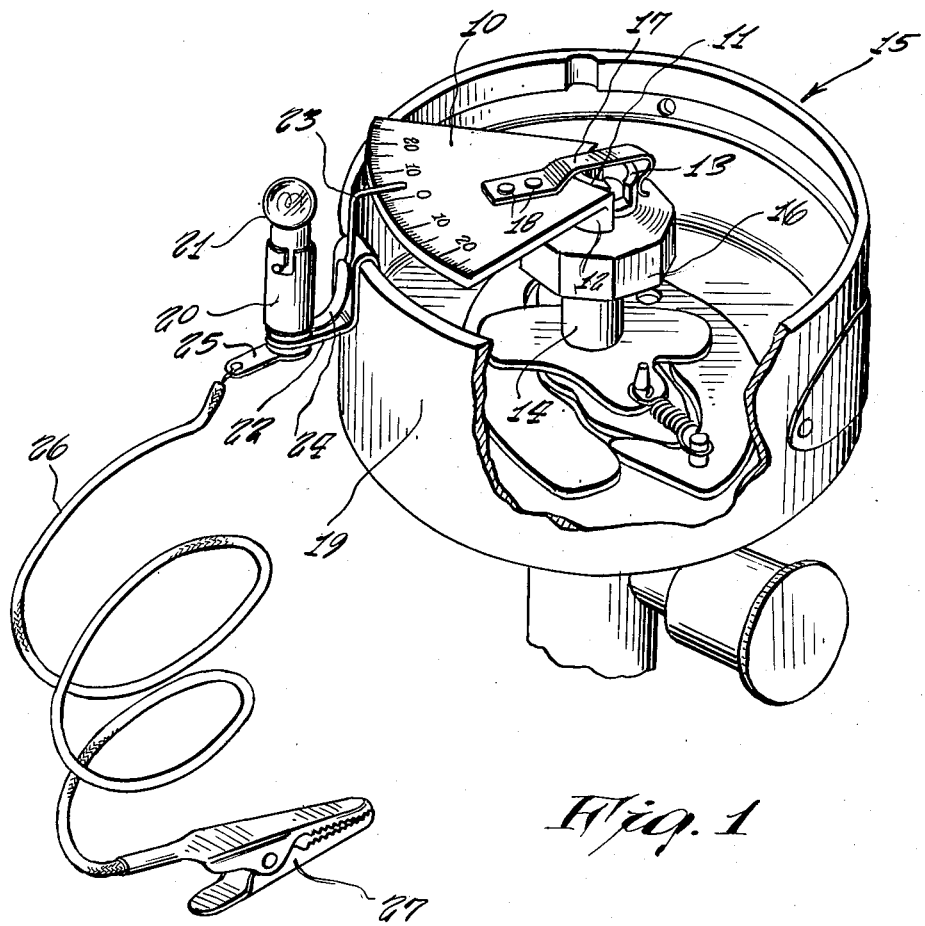
Figure 2:
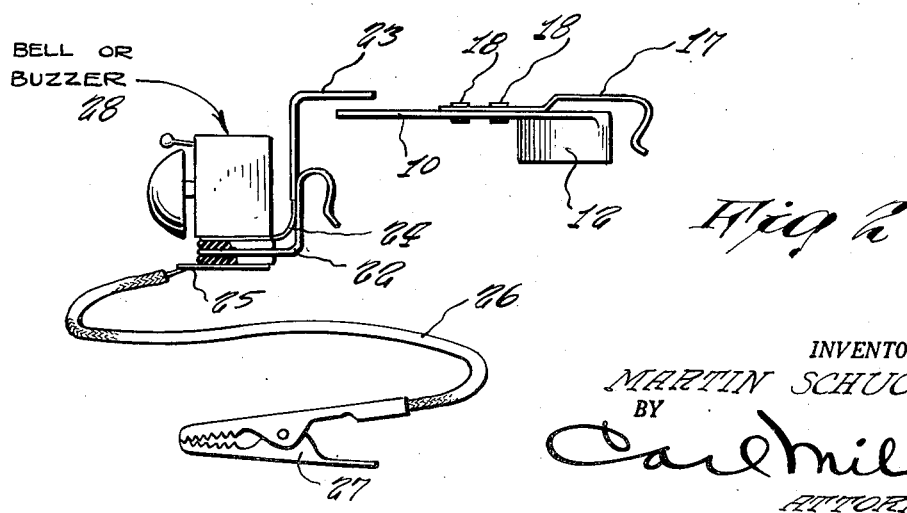

For other objects and for a better understanding of the invention, reference may be had to the following detailed description taken in connection with the accompanying drawing, in which:

Fig. 1 is a perspective view of an ignition tester embodying the features of the present invention and showing the same in operative use on the distributor of an auto, the alligator clamp leading off to a condenser, not shown and Fig. 2 is a side elevational view of a modified form of the present invention, shown alone.

Referring now in detail to Fig. 1, and in the practice of my invention, there is shown an arcuate scale 10 of plastic or other suitable material having a substantially V-shaped cut-out 11 at its inner end and having an integrally formed, downwardly extending flange 12 along said cut-out whereby to engage one-half the outer surface of a cylindrical member 13 provided at the top of shaft 14 of distributor 15. The lower edge of the flange 12 rests on the nut 16 of the distributor, the scale 10 being maintained in fixed contact with the member 12 by means of an L-shaped clamp 17 secured to the upper surface of the scale 10 by rivets 18 and having a downwardly bent free end resiliently engaging the side of cylindrical member 12. The flange 12 is of sufficient height to support the scale 10 slightly above the rim of the distributor housing 19 for a purpose to be hereinafter described, the outer edge of the scale terminating slightly within the rim of the housing 19.

The outer upper edge of the scale 10 is provided with divisions, each division indicating a degree of angular rotation, the divisions being numbered outwardly from the center of the scale substantially as illustrated in Fig. 1, and for a purpose to be hereinafter described.

A bulb socket 20 provided with a bulb 21 is mounted upon a spring clamp 22 adapted to resiliently engage the distributor housing 19 along its upper edge in the manner shown in Fig. 1, an L-shaped indicator 23 being secured to the outer side of the clamp 22 by means of a spring member 24 secured to the base of the socket 20 intermediate the clamp 22 and the socket 20. The vertical portion of the indicator 23 extends above the edge of the housing 19 a sufficient distance to permit the horizontal portion thereof to extend inwardly across the scale 10 thereby permitting a direct reading of the divisions provided on the outer edge of the scale. A contact 25 connects one terminal of the socket 20 to a wire 26 which is in turn connected to an alligator clamp 27, the alligator clamp 27 being adapted to engage the contact terminal of a car condenser, not shown. The other terminal of the socket is grounded through the clamp 22 and the housing 19 in an obvious manner.

In operation, the scale 10 is first snapped into position on the cylindrical member 13 by means of the flange 12 and the clamp 17. In this attached position, the scale 10 will rotate with the nut 16 and the distributor shaft 14 due to frictional engagement between the flange 12, the clamp 17 and the outer surface of the cylindrical member 13.

The bulb 21 and the socket 20 along with their associated indicator 23 are then secured to the rim of the housing 19 by means of the spring clamp 22, with the indicator 23 resting above the divisions on the scale 10.

The alligator clamp 27 is then connected to the contact terminal of the car condenser.

With the ignition key of the car turned on, the motor is turned manually over, as for instance, by manually rotating the fan of the motor, until the bulb 21 lights up.

At this point, the scale 10 is manually adjusted angularly relative to the nut 16 and shaft 14 until the indicator 23 is directly over scale reading corresponding to one-half the number of degrees in the cam dwell of the distributor. For example, if the cam dwell of the distributor is 36 degrees, the scale 10 is rotated relative to the shaft 14 and nut 16 until the indicator 23 rests directly above the reading of 18 degrees on the scale 10.

The motor is again turned over manually until the bulb 21 goes out. At the point of rotation of the shaft 14 and the scale 10 at which the bulb 21 goes out, the indicator 23 should again read 18 degrees on the scale 10, on the opposite side of the zero marking thereon. If this reading is not 18 degrees, or identical with the original setting of one half the degrees of the cam dwell, it indicates that the ignition points should be adjusted.

Referring now to Fig. 2, and in the further practice of my invention, there is shown a modified form of the present invention, differing from the first form in the construction of the signal means.

A bell or buzzer 28 is now mounted on the clamp 22, one terminal of the bell or buzzer 28 being grounded through the clamp 22 and the housing 19, the other terminal of the bell or buzzer being connected to the car condenser by means of the wire 26 and the alligator clamp 27.

The operation of this form of the invention is similar to the first form except that the scale 10 is now set to one half the degrees of the cam dwell of the distributor when the buzzer or bell rings, and the final reading is taken when the buzzer or bell stops ringing.

In other respects, the form of the invention shown in Fig. 2 is the same as that illustrated in Fig. 1, and like reference numerals identify like parts in each of the views.

It should now be apparent that there has been provided an ignition tester which is readily and easily attached to the distributor of an auto and which by a direct reading will enable the user to adjust his ignition points to factory specifications.

While various changes may be made in the detailed construction, it shall be understood that such changes shall by within the spirit and scope of the present invention as defined by the appended claim.

Having thus set forth and disclosed the nature of my invention, what is claimed is:

In an auto distributor having a central rotatable shaft and which includes an auto-condenser, a nut secured to said shaft near the top thereof, and a cylindrical member extending upward from the nut, and a cylindrical housing surrounding the upper portion of the shaft, an ignition tester comprising an arcuate plate, said plate having a circular edge conforming to the curvature of the upper rim of the housing and radially disposed side edges extending inwardly toward the said distributor shaft, said plate having at its inner end a substantially V-shaped cut-out surrounding the said cylindrical member on one side thereof and extending into a downwardly extending flange integrally formed with the said plate, the said flange engaging the said cylindrical member on one side thereof, the lower edge of said flange resting on the said nut, a substantially L-shaped clamp of spring metal rigidly secured to the upper surface of said plate adjacent the said cut-out, said clamp having a downwardly bent free end resiliently engaging the opposite side of the said cylindrical member, said flange being of sufficient height to support the said plate slightly above the rim of the distributor and being formed at substantially right angles thereto whereby to support said plate in substantially horizontal position, a scale disposed on the said plate adjacent said outer circular edge, the divisions of the said scale corresponding with degrees of rotation of the said plate and the shaft of the distributor, the said divisions being numbered outwardly from the center of said outer circular edge on each side thereof, a clamp secured to the upper edge of the said cylindrical housing opposite the circular edge of the said plate, electric signalling means mounted on the said clamp, one terminal of the said signalling means being connected with the said circular housing and the other terminal of the said signalling means being connected with the said auto condenser, and an indicator mounted on the said clamp and extending above and over the scale of the said plate, so that upon turning the said central shaft together with the said plate, the indicator permits reading of the angular displacement of the said central shaft relative to the said circular housing.

MARTIN SCHUCH.

References Cited in the file of this patent

UNITED STATES PATENTS

| Number | Name | Date |
|--------|------|------|
| 2,090,020 | Ballou | Aug. 17, 1937 |
| 2,355,211 | Erickson | Aug. 8, 1944 |